(12) United States Patent
Dede et al.

(10) Patent No.: US 11,387,506 B2
(45) Date of Patent: Jul. 12, 2022

(54) THERMAL MANAGEMENT SYSTEMS INCLUDING VAPOR CHAMBERS AND PHASE CHANGE MATERIALS AND VEHICLES INCLUDING THE SAME

(71) Applicant: Toyota Motor Engineering & Manufacturing North America, Inc., Plano, TX (US)

(72) Inventors: Ercan Mehmet Dede, Ann Arbor, MI (US); Shailesh N. Joshi, Ann Arbor, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 42 days.

(21) Appl. No.: 16/176,543

(22) Filed: Oct. 31, 2018

(65) Prior Publication Data

US 2020/0136216 A1   Apr. 30, 2020

(51) Int. Cl.
*H01M 10/00* (2006.01)
*H01M 10/6569* (2014.01)
(Continued)

(52) U.S. Cl.
CPC ......... *H01M 10/6569* (2015.04); *B60L 58/26* (2019.02); *F28D 15/04* (2013.01);
(Continued)

(58) Field of Classification Search
CPC ........... H10M 10/6569; H10M 10/613; H10M 10/6554; H10M 10/6559; H10M 10/6568;
(Continued)

(56) References Cited

U.S. PATENT DOCUMENTS

| 2009/0218070 A1* | 9/2009 | Fries | F28F 13/003 |
| | | | 165/41 |
| 2012/0003523 A1 | 1/2012 | Schaller et al. | |

(Continued)

FOREIGN PATENT DOCUMENTS

| CN | 102231447 | 11/2011 |
| CN | 103855441 | 6/2014 |

(Continued)

OTHER PUBLICATIONS

Lucia Ianniciello, et al., Electric vehicles batteries thermal management systems employing phase change materials, Journal of Power Sources 378 (2018) 383-403.

(Continued)

*Primary Examiner* — Harry E Arant
(74) *Attorney, Agent, or Firm* — Dinsmore & Shohl LLP

(57) ABSTRACT

A thermal management system for removing waste heat from a battery cell. The thermal management system includes a unit cell that includes a vapor chamber including an evaporator surface and a condenser surface. The evaporator surface and the condenser surface are fluidly connected by a wick. The unit cell also includes a phase change material (PCM) shell encapsulating a PCM. The evaporator surface is thermally coupled to the battery cell and absorbs waste heat generated by the battery cell. The condenser surface is thermally coupled to the PCM and rejects waste heat to the PCM.

20 Claims, 4 Drawing Sheets

(51) Int. Cl.
*H01M 10/659* (2014.01)
*H01M 10/625* (2014.01)
*F28D 15/04* (2006.01)
*F28D 20/02* (2006.01)
*H01M 10/613* (2014.01)
*B60L 58/26* (2019.01)

(52) U.S. Cl.
CPC ........ *F28D 20/021* (2013.01); *H01M 10/613* (2015.04); *H01M 10/625* (2015.04); *H01M 10/659* (2015.04)

(58) Field of Classification Search
CPC ... H10M 10/625; H10M 10/659; B60L 58/26; F28D 20/021; H01M 10/6569; H01M 10/613; H01M 10/6554; H01M 10/6559; H01M 10/6568; H01M 10/625; H01M 10/659
See application file for complete search history.

(56) References Cited

U.S. PATENT DOCUMENTS

2012/0012281 A1* 1/2012 Franz ................. G06F 1/20
                                              165/104.26
2017/0092999 A1* 3/2017 Tarlau ................. H01M 10/613
2018/0031326 A1* 2/2018 Jansen ................. F28D 20/023

FOREIGN PATENT DOCUMENTS

| CN | 108075081 | 5/2018 | |
|---|---|---|---|
| WO | 2015107106 | 7/2015 | |
| WO | 2017103449 | 6/2017 | |
| WO | WO-2018060604 A1 * | 4/2018 | .......... H01M 10/659 |

OTHER PUBLICATIONS

Nelson O. Moraga et al., Cooling Li-ion batteries of racing solar car by using multiple phase change materials, Applied Thermal Engineering 108 (2016) 1041-1054.

* cited by examiner

THERMAL MANAGEMENT SYSTEMS INCLUDING VAPOR CHAMBERS AND PHASE CHANGE MATERIALS AND VEHICLES INCLUDING THE SAME

TECHNICAL FIELD

The present specification generally relates to heat management systems for removing heat from electric batteries and, more specifically, to heat management systems for removing heat from electric batteries using a vapor chamber and a phase change material.

BACKGROUND

Electric batteries may generate waste heat as they convert chemical energy to electrical energy. This waste heat can be transferred to a heat exchanger and rejected to the atmosphere to cool the electric battery. Batteries that power electric vehicles may be subject to large variations in battery use and battery use rate based on driving behavior and conditions. Large variations in battery use and battery use rate require a heat exchanger with a robust heat absorption capability that is able to absorb heat from the battery at low use rates and at high use rates for an extended period of time. Thus, effective thermal management systems for removing heat from batteries may be desired.

SUMMARY

In one embodiment, a thermal management system for removing waste heat from a battery cell includes a unit cell that includes a vapor chamber including an evaporator surface and a condenser surface. The evaporator surface and the condenser surface are fluidly connected by a wick. The unit cell also includes a phase change material (PCM) shell encapsulating a PCM. The evaporator surface is thermally coupled to the battery cell and absorbs waste heat generated by the battery cell. The condenser surface is thermally coupled to the PCM and rejects waste heat to the PCM.

In another embodiment, a unit cell for a battery module includes a vapor chamber including an evaporator surface and a condenser surface. The evaporator surface and the condenser surface are fluidly connected by a wick. The unit cell further includes a PCM shell that encapsulates a PCM. The evaporator surface is configured to transfer heat to a working fluid to heat the working fluid to evaporate the working fluid, the condenser surface is configured to transfer heat from the working fluid to the PCM to condense the working fluid, and a latent heat of fusion temperature of the PCM is lower than a latent heat of vaporization temperature of the working fluid.

In yet another embodiment, a vehicle includes a thermal management system for removing heat from a plurality of battery cells of a battery module of the vehicle. The thermal management system includes an array of unit cells. Each unit cell includes a vapor chamber including a working fluid and an evaporator surface and a condenser surface that are fluidly connected by a wick, and a PCM shell encapsulating a PCM. The evaporator surface is thermally coupled to at least one of the plurality of battery cells and absorbs waste heat generated by at least one of the plurality of battery cells. The condenser surface is thermally coupled to the PCM and rejects waste heat to the PCM.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
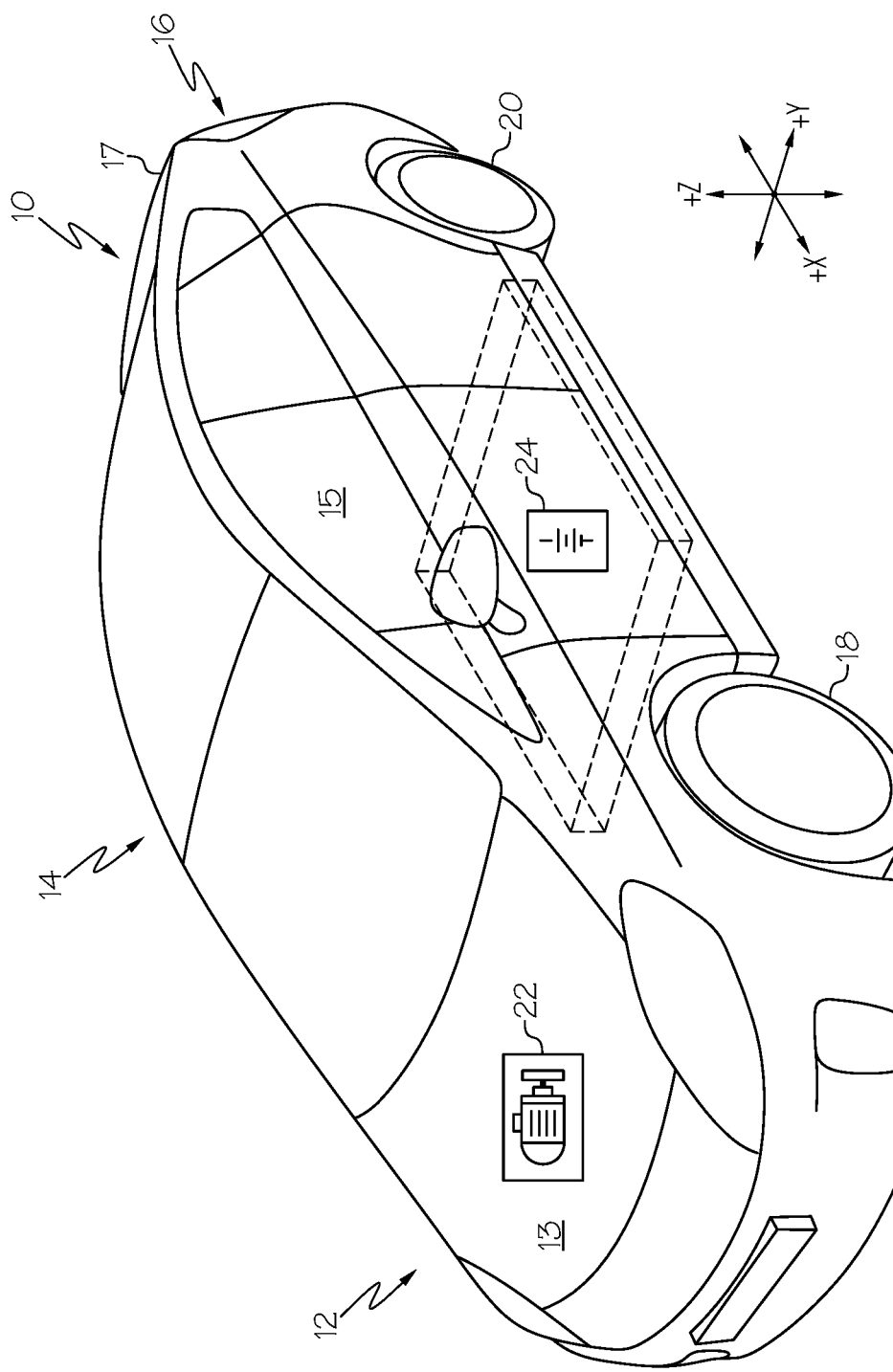
FIG. 1 depicts a vehicle including a battery module and an electronic drive motor for powering the vehicle according to one or more embodiments shown and described herein.

Electric vehicles may include one or more batteries that store chemical energy in one or more battery cells, and transforms the stored chemical energy to electrical energy on demand to power one or more systems of the electric vehicle (e.g., an electric drive motor, a control system, etc.). As used herein, the term "battery" refers to any type of electrochemical energy store that includes one or more chemical reactants configured to react with an external reactant in an electrochemical reaction to produce an electric potential. This transformation of chemical energy to electrical energy may generate waste heat.

A plurality of battery cells may be configured in series, in parallel, or some combination of the two to power the drive mechanisms and other systems of electric vehicles. Batteries used to power electric vehicles and other similar applications pose particular challenges due to the size and weight of vehicles and the requirement for interoperability with other systems. Moreover, batteries in electrified vehicles (e.g., hybrid electric vehicles, plug-in hybrid electric vehicles, and electric vehicles (collectively, "electric vehicle" or "electric vehicles")) are generally designed to be as small as possible and therefore may require dense power generation capabilities. Because batteries generate waste heat as they operate, dense power generation results in dense heat generation. Waste heat must be removed from the battery for proper sustained operation.

Batteries may be cooled using an active cooling heat exchanger. Active cooling heat exchangers may include heat exchangers in which one or more cooling fluids (e.g., air) are forced over an external surface of one or more battery cells.

However, the use of active cooling introduces complexity (e.g., space considerations) and active cooling measures alone may not be the most efficient method for cooling a battery. Additionally, active cooling heat exchangers may not have sufficient heat removal capacity to absorb and reject the quantities of heat generated by the batteries.

Moreover, differences in heat generation and flux may exist between the various cells in a battery. For example, in batteries including an air channel, the battery cells nearest an air inlet may receive cooler air than the battery cells near an air outlet because the air may heat up as it flows over the batteries nearer the inlet. Additionally, the temperature of any particular battery cell may be higher on average near the center of a cell rather than at the extremities where waste heat may be rejected to external systems. Further, the impedance distribution between cells or groups of cells may vary resulting in temperature variations between cells or groups of cells. Moreover, variations in impedance distribution may be amplified as temperatures increase in the battery during battery use. Accordingly, a thermal management system incorporating heat transfer mechanisms in addition to active cooling may be required.

Phase change materials (PCM) generally have a high heat of fusion and are capable of storing and releasing large amounts of energy. PCMs absorb heat as they change from a solid to a liquid (i.e., melt) and release heat as they change from a liquid to a solid (i.e., solidify). The amount of heat absorbed or released during this process is referred to as the latent heat of fusion (LHF).

Certain PCMs may have between 5 and 14 times the specific heat capacity as water, making them ideal heat absorption mediums. Moreover, PCMs have several advantageous characteristics in a vehicle context. For example, PCMs solidify without much undercooling, meaning that ambient air may suffice in many cases to solidify the PCM. Additionally, many PCMs are compatible with conventional construction materials that are compatible with vehicle construction. Further, some PCMs are generally chemically stable, non-reactive, and recyclable. In addition, some PCMs may be integrated with other types of heat exchangers.

Vapor chambers incorporate a working fluid into a hermetically sealed hollow vessel that forms a closed-loop capillary recirculation system. Heat input to the evaporator vaporizes the working fluid, which flows to the condenser surfaces. After the vapor condenses on the condenser surfaces, capillary forces in the wick return the condensate to the evaporator and the cycle repeats. Because of the capillary forces in the wick, most vapor chambers are able to return condensate to the evaporator even against the force of gravity (e.g., when the evaporator is above the condenser with respect to the force of gravity). Accordingly, many vapor chambers will still operate when inverted, increasing the number and type of configurations for which a vapor chamber may be applicable. Moreover, as described herein, a vapor chamber may incorporate a gradient into the wick which inhibits the working fluid from flowing through the wick in a reverse direction and thus inhibits heat transfer from the condenser surface to the evaporator surface in the event that the temperature of the battery is below the temperature of a heat sink to which the battery is connected (e.g., the PCM).

Embodiments disclosed herein include thermal management systems with one or more of a phase-change materials (PCM) and one or more vapor chambers. Rejection of waste heat to one or more thermal management systems incorporating one or more PCMs and one or more vapor chambers may enhance battery operation. By removing heat form the battery, thermal management systems incorporating the functionality disclosed herein may extend the level and duration that a battery system can be used to power one or more electric systems. Accordingly in an electrified vehicle context, an electric vehicle can travel further, faster, and more reliably from one place to another, enhancing a user experience.

The principals described herein can be embodied in a number of applications. The illustrative application shown in FIG. 1 includes an illustrative vehicle 10 that includes a front section 12 including an engine bay 13, a middle section 14 including a cabin 15, and a rear section 16 including a trunk 17. Although embodiments are described in the context of electric vehicles, embodiments are not limited thereto. The thermal management systems described herein may be employed in any battery application.

The vehicle 10 also includes front wheels 18 and rear wheels 20, either of which or both may be driven by an electric drive motor 22. The electric drive motor 22 may receive electric power from a battery module 24. The battery module 24 may include one or more battery cells (FIGS. 2A and 2B) that convert chemical energy into electrical energy as described in greater detail herein. While the vehicle 10 in the particular example embodiment shown in FIG. 1 is a sedan, it is to be understood that other embodiments of the vehicle 10 could take any body style, for example, a truck, a sport utility vehicle (SUV), a van, a coupe, etc.

Additionally, while the battery module 24 is shown in the middle section 14 and the electric drive motor 22 is shown in the engine bay 13 in the particular example embodiment shown in FIG. 1, the battery module 24 and/or the electric drive motor 22 could be positioned in any portion of the vehicle 10. For example, it is contemplated that the battery module 24 and/or the electric drive motor 22 may be positioned in the front section 12, the middle section 14, or the rear section 16 in any combination.

Figure 2A:
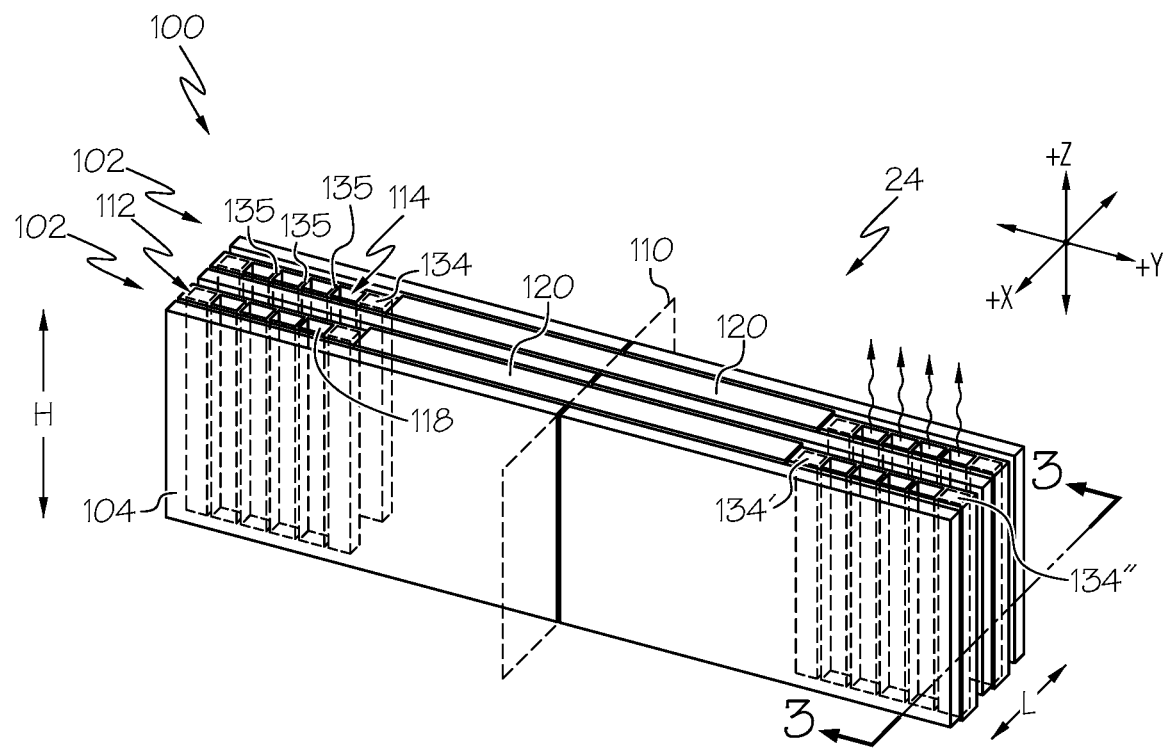
FIG. 2A depicts a thermal management system for removing heat from a battery cell including a phase change material (PCM) and a vapor chamber according to one or more embodiments shown and described herein.

The battery module 24 of the vehicle 10 of FIG. 1 may be cooled by a thermal management system 100 such as that depicted in FIG. 2A. The particular exemplary embodiment of the thermal management system 100 of FIG. 2A includes a unit cell 102 that includes a vapor chamber 104 including a working fluid, and a PCM shell 112 that holds a PCM 142 (FIG. 3A) for cooling a battery cell 120. The unit cell 102 may be a component of a larger battery module, such as the battery module 24. In some embodiments, the components and the arrangement of the unit cell 102 may be mirrored across a midline 110 of the thermal management system 100, but embodiments are not limited thereto. It is contemplated that one or more heat transfer characteristics or other characteristics of the unit cell 102 may be different on opposite sides of the battery cell 120. For example, a working fluid on one side (i.e., in one of the vapor chambers 104) of the unit cell 102 may be different than a working fluid in the vapor chamber 104 on the opposite side. As used herein, the term "heat transfer characteristics" is used to refer to the properties for transferring heat between at least two materials and may refer to any property affecting the generation, use, conversion, and exchange of thermal energy between various physical systems. Heat transfer characteristics may refer to the various mechanisms for thermal transfer, for example, thermal conduction, thermal convection, thermal radiation, and transfer of energy by phase changes as well as the various properties of matter related to heat transfer, for example, boiling temperature (i.e., liquid-to-gas phase transition temperature), melting temperature (i.e., solid-to-liquid phase transition temperature), heat capacity, thermodynamic enthalpy, thermodynamic entropy, and other related characteristics.

The vapor chamber 104 includes multiple heat transfer surfaces that serve to generally reject heat from the battery cell 120 and transfer the heat to one or more other components. For example, the vapor chamber 104 may reject heat from the battery cell 120 to one or more PCMs 142 encapsulated in one or more capsules 134 of the PCM shell 112. Specific internal components of the vapor chamber 104 are described in greater detail herein.

Figure 2B:
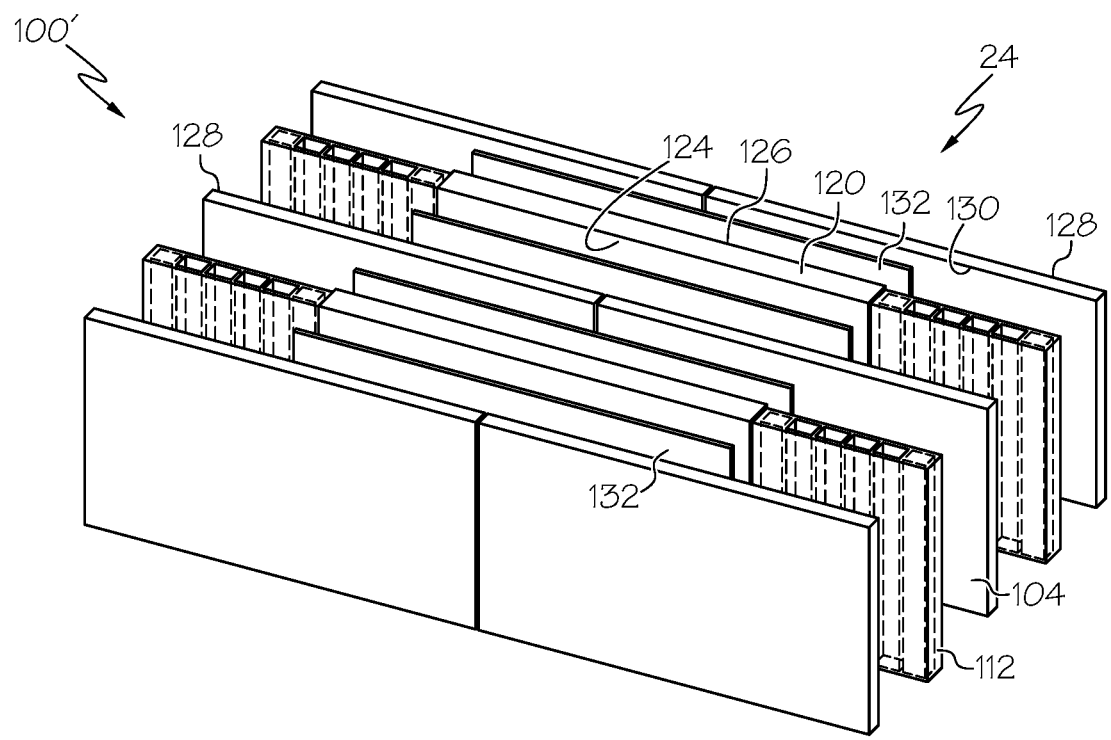
FIG. 2B depicts the thermal management system of FIG. 2A in an exploded view according to one or more embodiments shown and described herein.

The PCM shell 112 includes one or more ducts 114 separated by one or more ribs 135. Each of the ducts 114 includes an inlet (not shown) and an outlet 118. Air flows into the inlet and exits the outlet 118 to remove heat from one or more of the vapor chamber 104, the PCM 142 (FIG. 3A) through the PCM shell 112, and the battery cell 120 by convection. The ducts 114 may be formed by the ribs 135 and/or the capsules 134. Multiple unit cells 102 and battery cells 120 may be arranged in an array to form the battery module 24 of FIG. 1 that may be used to power one or more electric systems of the vehicle 10, for example, the electric drive motor 22. As shown in FIGS. 2A and 2B, the array of unit cells 102 may include alternating battery cells 120 and PCM shells 112 with vapor chambers 104.

The PCM shell 112 may be constructed of an electrically-insulating but thermally-conductive material. Non-limiting examples include thermally conductive polymers, silicone-based rubbers, epoxies, aluminum nitride, and boron nitride. Accordingly, the PCM shell 112 may electrically isolate one battery cell 120 from the other battery cells 120. In some embodiments, the PCM shell 112 may be constructed of an electrically and thermally conductive material, for example, a metal such as nickel, copper, silver, tungsten, and the like. In such embodiments, one or more electrically isolating components may be positioned between adjacent unit cells 102 to electrically insulate consecutive battery cells 120 as described in greater detail herein. In some embodiments, the PCM shell 112 is filled with or made of a porous material or structure, such as, for example, a metal foam (e.g., a closed-cell metal foam or an open-cell metal foam) or a metal inverse opal. In some embodiments, the PCM shell 112 may be filled primarily with a metal foam or metal inverse opal having a PCM (e.g., the PCM 142) filling one or more of the pores or other voids in the porous structure.

The PCM shell 112 may have isotropic or anisotropic characteristics. That is, the PCM shell 112 may inhibit the transfer of heat in one or more directions and promote the transfer of heat in one or more other directions. For example, the PCM shell 112 may have anisotropic characteristics that promote the transfer of heat from the battery cell 120 to the PCM 142 (FIG. 3A) in the PCM shell 112.

FIG. 2B depicts a thermal management system 100' in an exploded view that is similar to the thermal management system 100 of FIG. 2A. Briefly referring to FIG. 2B, the battery cell 120 may be coupled between consecutive vapor chambers 104 and may be thermally and/or electrically coupled to the vapor chamber 104 at a first face 124 and a second face 126 of the battery cell 120. The first face 124 and the second face 126 of the battery cell 120 face toward a first face 128 and a second face 130 of the vapor chamber 104, respectively. Each of the battery cells 120 in the module 24 include the first face 124 and the second face 126 and each of the vapor chambers 104 include the first face 128 and the second face 130. Accordingly, the first face 124 of the battery cell 120 and the first face 128 of the vapor chamber 104 form a heat transfer interface and the second face 126 of the battery cell 120 and the second face 130 of the vapor chamber 104 form a heat transfer interface. As shown in FIG. 2B, the shim 132 may be disposed in between adjacent ones of the battery cell 120 and the vapor chambers 104. The shim 132 may electrically isolate the battery cell 120 from the vapor chamber 104 as described in greater detail herein. Accordingly, the first face 124 and the second face 126 of the battery cell 120 may be coupled to the first face 128 and the second face 130 of the vapor chamber 104 through the shim 132.

Still referring to FIG. 2B, in some embodiments, the first face 124 and the second face 126 of the battery cell 120 may be constructed of a thermally conductive, electrically isolating material. Non-limiting examples include thermally conductive polymers, silicone-based rubbers, epoxies, aluminum nitride, and boron nitride. In other embodiments, the first face 124 and the second face 126 of the battery cell 120 may be constructed of a thermally and electrically conductive material. Non-limiting examples include metals or metal-based alloys, such as nickel, copper, cadmium, silver, and the like. In some embodiments, the first face 128 and the second face 130 of the vapor chamber 104 may be constructed of a thermally conductive, electrically isolating material. Non-limiting examples include thermally conductive polymers, silicone-based rubbers, epoxies, aluminum nitride, boron nitride, and the like. In other embodiments, the first face 128 and the second face 130 of the vapor chamber 104 may be constructed of a thermally and electrically conductive material. Non-limiting examples include metals or metal-based alloys, such as nickel, copper, cadmium, silver, and the like.

Still referring to FIG. 2B, in some embodiments, an insulating shim 132 is positioned between the first face 124 of the battery cell 120 and between the first face 128 of the vapor chamber 104 and the second face 126 of the battery cell 120 and the second face 130 of the vapor chamber 104. The insulating shim 132 may be made from an electrically-insulating but thermally-conductive material. Non-limiting examples include silicone-based rubbers, epoxies, aluminum nitride, and boron nitride. The insulating shim 132 inhibits the flow of electricity from the battery cell 120 to the various other components of the battery module 24 but permits the flow of waste heat generated in the battery cell 120. It is contemplated that not all embodiments of the thermal management system 100 include a shim 132 (e.g., embodiments in which the PCM shell 112 is thermally and electrically insulating).

Referring to FIGS. 2A and 2B, the PCM shell 112 may be disposed between consecutive vapor chambers 104 in the battery module 24 forming a structure of battery cells 120 with PCM shells 112 at the externalities of the battery cell 120 and alternating vapor chambers 104. In some embodiments, the alternating structure of the battery module 24 may end with a PCM shell 112 such that the PCM shell at the end of a battery module 24 is thermally and/or electrically coupled to only one vapor chamber 104.

The ribs 135 of the PCM shell 112 extend between opposing sidewalls 137 (FIG. 3A) and may form one or more of the ducts 114. The ribs 135 may be substantially planar structures with a substantially flat profile. The ribs 135 may provide structural support to the thermal management system 100. In some embodiments, the ribs 135 are thermally conductive and heat transfers from the opposing sidewalls 137 to the ribs 135 to the air flowing through the ducts 114. Because the opposing sidewalls 137 are in thermal communication with the vapor chambers 104, heat transfers from the vapor chambers 104 to the ribs 135 and is rejected to the air flowing through the ducts 114. In some embodiments, the ribs 135 may have anisotropic characteristics, for example, they may promote the flow of heat from the opposing sidewalls 137 toward the middle of the rib 135 and inhibit the flow of heat in the opposite direction, thus inhibiting heat from flowing from the ribs 135 to the vapor chamber 104. In some embodiments, the thermal characteristics of the ribs 135 are isotropic. In some embodiments, the ribs 135 may have anisotropic properties along the vertical direction to promote or inhibit thermal flux in a vertical gradient. Accordingly, the ribs 135 may be constructed from a material capable of exhibiting anisotropic properties, for example, the ribs 135 may be constructed from or include composite materials including ceramic, quartz, or similar materials. In some embodiments, the ribs 135 may be constructed of a metal, such as copper, nickel, silver, tin, and the like.

Referring to FIGS. 2A and 2B, the battery cell 120 is a battery that transforms chemical energy to electrical energy. Non-limiting examples of batteries include Li-ion batteries, lead acid batteries, such as $PbSO_4$ batteries, and other chemical batteries. In some embodiments, a series of battery cells 120 are electrically connected to form the battery module 24 that may power the vehicle 10 of FIG. 1. Additionally, each battery cell 120 may be individually or collectively electrically coupled to one or more systems external to the thermal management system 100 (e.g., one or more systems of an electric vehicle). The battery cell 120 may generate waste heat as it converts chemical energy to electrical energy to provide electrical power to one or more external electric systems. The battery cells 120 may be disposed between unit cells 102 to form an array making up the battery module 24. Accordingly, the battery cells 120 may transfer waste heat to two unit cells 102 during operation of the battery module 24.

Figure 3A:
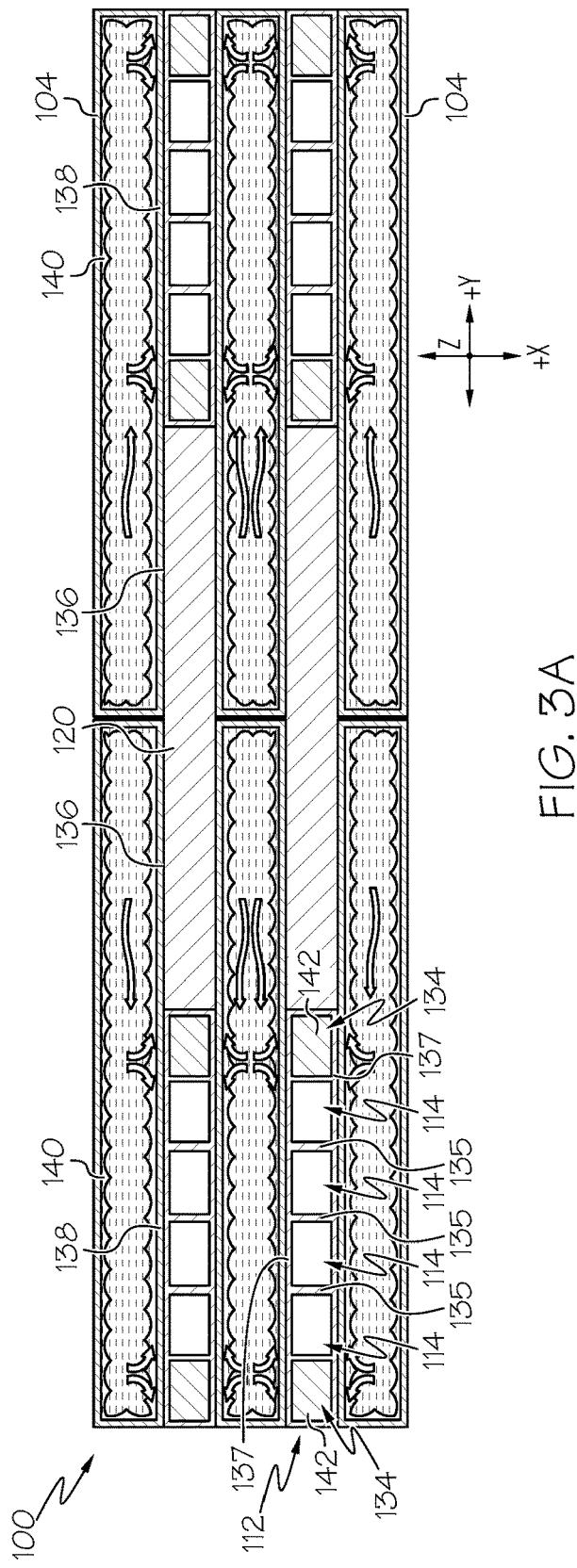
FIG. 3A depicts the thermal management system of FIG. 2A from a top perspective according to one or more embodiments shown and described herein.

FIG. 3A shows a cross section of the thermal management system 100 cut along the indicated line ("3") in FIG. 2A. FIG. 3A shows the PCM shell 112 encapsulating the PCM 142. The PCM shell 112 may include one or more capsules 134 that encapsulate the PCM 142 and one or more ribs 135 for providing support for opposing sidewalls 137 of the PCM shell 112. The capsules 134 may be voids that extend between the opposing sidewalls 137. In some embodiments, a PCM, such as the PCM 142, may fill the void. The voids formed by the capsules 134 may be closed during construction of the PCM shell 112 or after. For example, a cap may be placed on the capsules 134 after they are filled with a PCM. In other embodiments, the capsule 134 may have a unitary construction and be formed around the PCM.

Between the capsules 134, air may flow through the one or more of the ducts 114. In some embodiments, one or more walls of the capsules 134 are thermally conductive and may transfer heat from the vapor chamber 104 to the PCM 142 in the capsule 134 and from the PCM 142 in the capsule 134 to the air flowing through the duct 114. In some embodiments, the capsules 134 are formed from the same material as the PCM shell 112. For example, one or more of the capsules 134 and the PCM shell 112 may be formed from a thermally conductive material, such as a metal (e.g., copper, silver, or the like). In some embodiments, one or more of the capsules 134 may have anisotropic characteristics, such that heat is more likely to flow from the PCM 142 to the walls surrounding the ducts 114 such that heat transfers more readily to the air in the ducts 114. In other embodiments, one or more of the capsules 134 and the PCM shell 112 may have isotropic characteristics.

Still referring to FIG. 3A, in some embodiments the PCM shell 112 includes four ducts 114 in between two capsules 134 and three ribs 135. The ribs 135 support the structure of the PCM shell 112 and act as a heat transfer fin transferring heat from a condenser surface 138 (explained in greater detail below) of the vapor chamber 104 to the air flowing through the duct 114. Embodiments are not limited to this arrangement, however. PCM shells 112 including any number of capsules 134 and/or ducts 114 are contemplated. For example, the PCM shell 112 may include three capsules 134 with one rib 135 between each capsule 134. Additionally, embodiments having only one capsule 134 and no ducts 114 are contemplated, for example, an embodiment in which the entire width of the PCM shell 112 includes a capsule like the capsule 134. In some embodiments, the capsules 134 may be modular with respect to the ducts 114, such that they can be installed and uninstalled into one or more of the ducts 114 based on characteristics of the battery module 24. The ribs 135 connect and support opposing sides of the PCM shell 112. In some embodiments, the ribs 135 are constructed from a material with a high thermal conductivity, non-limiting example including metals such as silver, copper, nickel, cadmium, platinum, etc. In some embodiments, the ribs 135 are constructed from a material with a high thermal conductivity and a high electrical resistivity, such as silicone-based rubbers, epoxies, aluminum nitride, or boron nitride.

As shown in FIG. 3A, the capsules 134 have a generally rectangular profile and, with reference to FIGS. 2A and 2B, extend vertically (i.e., the +/−Z direction) in the thermal management system 100. While the illustrated embodiment depicts rectangles, it is contemplated that the profile of the capsules 134 may be any shape, for example, a circle (forming a cylinder along the height H), a triangle (forming a triangular prism along the height H), etc. In some embodiments, the profile of the capsule 134 may change along a height H (FIG. 2A) of the battery module 24, for example, one or more dimensions of the profile of the capsule 134 may change. In some embodiments, the capsules 134 may extend continuously through the height H (FIG. 2A) of the thermal management system 100, but it is contemplated that the capsules 134 may be discontinuous or form one or more discrete sections along the height H (FIG. 2A) of the thermal management system 100. In some embodiments, the capsules 134 contain different PCMs made from different materials and/or with different thermal properties such that they absorb heat from the battery cell 120 at different rates. For example, embodiments are contemplated in which a PCM near an air inlet (not shown) at the bottom of the duct 114 may have different thermal transfer characteristics than a PCM near the outlet 118 (FIG. 2A) to account for a difference in the air temperature along the height H (FIG. 2A) of the duct 114. In some embodiments, the capsules 134 may contain different PCMs or PCMs with varying thermal transfer and absorption characteristics based on their position along a length L (FIG. 2A) of the battery module 24.

Additionally, the thermal characteristics of the PCM 142 may vary on opposite sides of the midline 110 or the thermal characteristics may vary between two or more PCMs in the same PCM shell 112. For example, with reference to FIG. 2A, an inside capsule 134', may encapsulate a PCM with different thermal properties than an external capsule 134". Although FIG. 2A indicates only one inside capsule 134' and only one external capsule 134", it is to be understood that each of the unit cells 102 may include capsules with different heat transfer characteristics between the inside and external capsules along the length L of the array and across the midline 110. The inside capsule 134' and the external capsule 134" may A PCM shell 112 with different properties between the inside capsule 134' and the external capsule 134" is merely one example arrangement for and other arrangements are contemplated. Accordingly, PCM 142 does not refer to any particular material composition. Instead, as used herein, the PCM 142 refers to the PCM that is in any one of the capsules 134. Embodiments are considered in which the PCM 142 in each of the capsules 134 may be the same material or composition of materials and embodiments are considered in which the PCM 142 in each of the capsules 134 may vary. Non-limiting examples of PCMs include paraffin, polyethylene glycols, clathrates, salthydrates, sugar alcohols, water, and water-salt mixtures. In some embodiments, the PCM may be a hybrid PCM, that includes one or more other constituents. For example, and without limitation, the PCM may be a graphene paraffin composite, a graphite paraffin composite, or a graphite paraffin nickel composite.

Referring again to FIG. 3A, the PCM 142 in each capsule 134 may be selected based on its melting temperature. For example, the PCM 142 may be selected to have a melting temperature below the maximum design temperature of the battery cell 120. In some embodiments, the PCM 142 in each of the capsules 134 has the same melting temperature. In some embodiments, the melting temperature of the PCM 142 may vary between different unit cells 102. The melting temperature of the PCM 142 is selected such that it is below the condensation temperature of a working fluid in the vapor chamber 104 as described in greater detail herein. Additionally, the melting temperature of the PCM 142 is above an expected temperature of the air passing through the ducts 114 such that the air passing through the ducts 114 can solidify the PCM 142.

Still referring to FIG. 3A, a cross-sectional top view of unit cells 102 surrounding the battery cell 120 shows the battery cell 120 in thermal communication with an evaporator surface 136 of the vapor chamber 104. The vapor chamber 104 may also include a condenser surface 138 and a wick 140 that fluidly couples the evaporator surface 136 with the condenser surface 138. The condenser surface 138 may be thermally coupled to the capsules 134 encapsulating the PCM 142 and to the ribs 135 of the PCM shell 112.

Figure 3B:
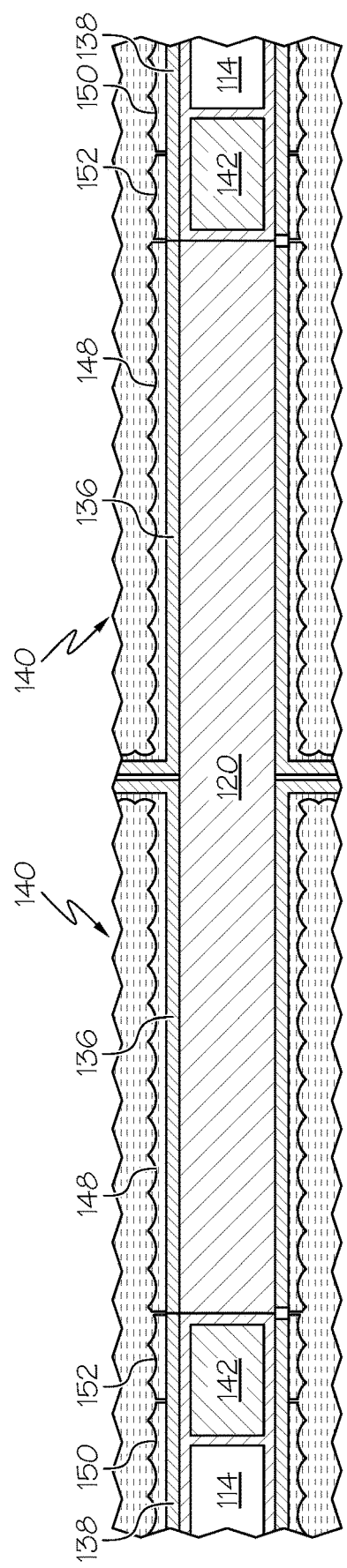
FIG. 3B depicts a close-up view of the thermal management system of FIG. 3A according to one or more embodiments shown and described herein.

Referring to FIGS. 3A and 3B, the evaporator surface 136 is thermally coupled to the battery cell 120. At least some of the waste heat generated by the battery cell 120 is absorbed by the working fluid inside the vapor chamber 104 at the evaporator surface 136. The waste heat heats the working fluid until the working fluid reaches the temperature of its LHV when it begins to evaporate, removing heat from the battery cell 120. The condenser surface 138 is thermally coupled to the PCM 142 and the air in the ducts 114 at the interface between the PCM shell 112 and the vapor chamber 104. The condenser surface 138 absorbs heat from the working fluid as it condenses at the condenser surface 138. The wick 140 uses capillary force to cause the working fluid to return from the condenser surface 138 to the evaporator surface 136 in liquid form as described in greater detail herein.

Referring to FIG. 3B, the wick 140 may comprise a collection structure 148 and a conduit structure 150 separated by an intermediate structure 152. The collection structure 148 may be physically and thermally coupled to the evaporator surface 136 and may be constructed of a thick wicking structure and may have a higher capillary force (e.g., high porosity and small pores). The collection structure 148 may be relatively thicker than the conduit structure 150 so that most of the working fluid in liquid form is stored in the collection structure 148 near the evaporator surface 136. The conduit structure 150 may have a lower capillary force and may be relatively thinner than the collection structure 148. As a result, less fluid may stay in the conduit structure 150. This results in greater circulation of the working fluid within the vapor chamber 104 as it absorbs the LHV from the battery cell 120 and rejects the LHV to the PCM 142.

The collection structure 148, the conduit structure 150, and the intermediate structure 152 are fluidly connected. Additionally, the collection structure 148 may have a higher capillary force than the intermediate structure 152 and the intermediate structure 152 may have a higher capillary force than the conduit structure 150. This gradient in capillary force may ensure that the working fluid (in liquid form) tends to be stored in the evaporator, even when no evaporation and condensation occurs. Additionally, it is to be understood that, while the particular embodiment shown in FIGS. 3A and 3B includes a wick 140 with a capillary force gradient, embodiments are contemplated in which the wick 140 does not have a capillary force gradient, for example, in embodiments in which the capillary force of the collection structure 148, the conduit structure 150, and the intermediate structure 152 are equivalent.

In some embodiments, the wick 140 may have a capillary force gradient with respect to the height H (FIG. 2A) of the thermal management system 100. For example, in some embodiments, the capillary force of the wick 140 may be stronger near a top of the thermal management system 100 (with respect to the force of gravity (i.e., the +/−Z-direction as shown in FIG. 2A)) than at a bottom of the thermal management system 100. This may tend to cause working fluid to be more tightly held by the wick 140 near the top of the thermal management system 100 and tend to counteract the force of gravity which may cause the working fluid to tend toward a bottom of the thermal management system 100.

In some embodiments, the wick 140 or portions thereof may be constructed from a metal, such as copper, nickel, cadmium, silver, gold, platinum, etc. In some embodiments, the wick 140 or portions thereof may be treated with metal particles, non-limiting examples including copper particles, silver particles, etc. To increase the porosity of the wick 140, one or more portions of the wick 140 may be configured as copper inverse opal. Additionally, the wick 140 may be constructed of a sintered metal powder, such as sintered copper, for example.

In some embodiments, the working fluid is selected to have a particular boiling temperature and specific heat capacity. That is, the boiling temperature of the working fluid may be selected based on one or more criteria, such as, for example, keeping the boiling temperature of the working fluid below the maximum operating temperature of the battery cell 120. In some embodiments, the boiling temperature of the liquid can be tuned by controlling the pressure inside the vapor chamber 104 during the packaging process. For example, the pressure inside the vapor chamber 104 may be increased and this may tend to increase the boiling temperature of the working fluid. Further, different fluids can be used for different applications, e.g. water, refrigerant, etc. By controlling the pressure inside the vapor chamber 104, the boiling temperature of the working fluid can be controlled.

Figure 4:
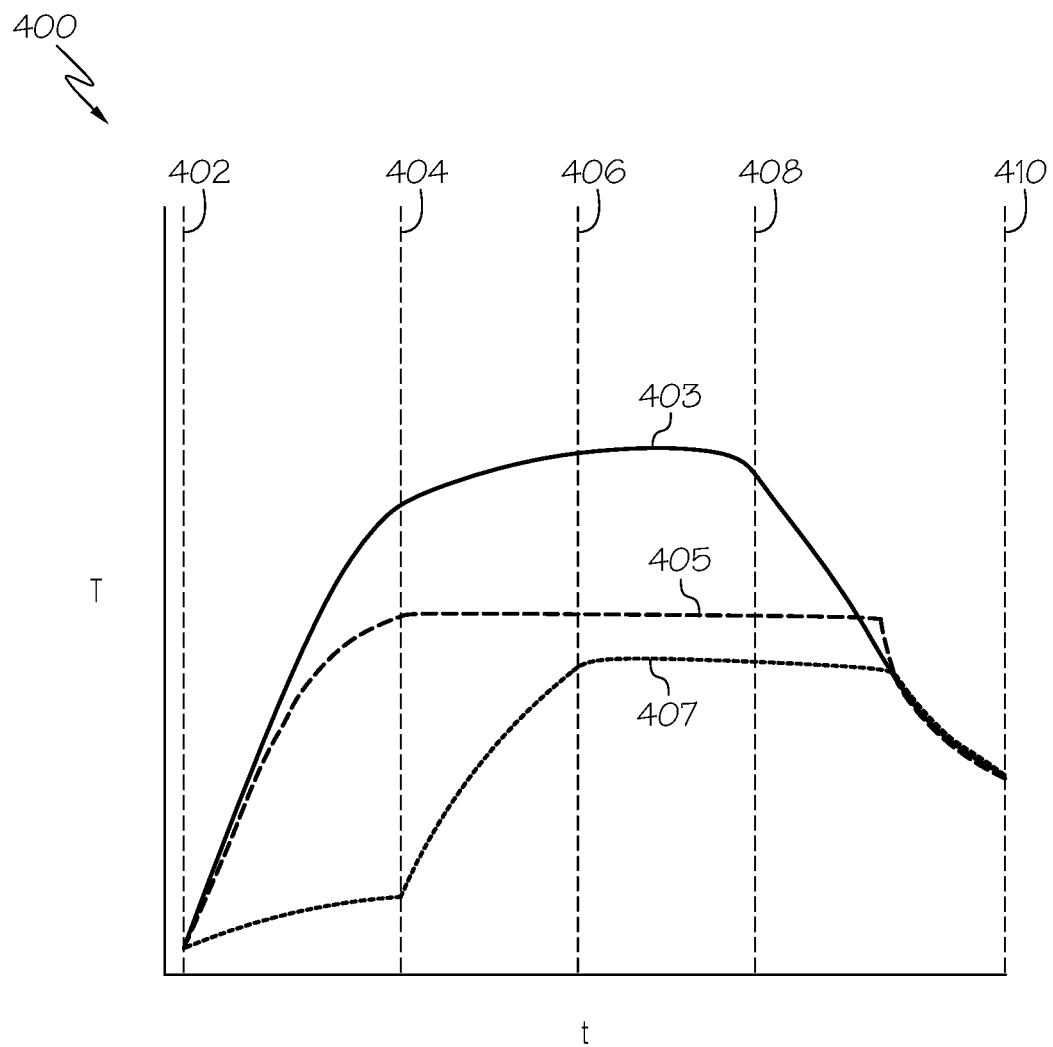
FIG. 4 depicts a chart showing the temperature of the battery cell of FIG. 2A during a cycle of the electric drive motor of FIG. 1 according to one or more embodiments shown and described herein.

The chart 400 shown in FIG. 4 illustrates an exemplary temperature profile of the battery cell 120 of FIGS. 2A and 2B during operation of the battery cell 120. One exemplary use of the battery cell 120 is to power the electric drive motor 22 of FIG. 1, but embodiments are not limited to this use. The embodiment depicted is operating at a constant pressure within the battery module 24. It is to be understood that the scenario illustrated in FIG. 4 is merely one example scenario and that other temperature profiles are possible.

As the vehicle 10 accelerates, the battery cells 120 in the battery module 24 convert chemical energy into electrical energy, sending current to the electric drive motor 22 to power the systems of the vehicle 10 (e.g., turn the front wheels 18 and rear wheels 20) and generating waste heat in the process. The chart 400 depicts the temperature of an illustrative example of one of the battery cells 120 of the battery module 24 at line 403, the temperature of the working fluid within the vapor chamber 104 at line 405, and the temperature of the PCM 142 at line 407.

At point 402, the battery module 24 begins to discharge electrical energy. As the battery cell 120 discharges electrical energy, waste heat is generated and the battery cell temperature increases. A temperature differential is developed between the battery cell 120 and the working fluid in the vapor chamber 104. Because the battery cell 120 is thermally coupled to the working fluid through the evaporator surface 136 of the vapor chamber 104, the working fluid absorbs heat from the battery cell 120. Accordingly, the temperature of the working fluid begins to rise as indicated at line 405.

As the temperature of the battery cell 120 continues to increase, the temperature of the working fluid also increases. The temperature of the working fluid continues to rise until it equals the battery cell temperature or the working fluid reaches its LHV. The working fluid reaches its LHV at point 404. Thus, the working fluid begins to boil. In some embodiments, the working fluid is selected based on its thermal properties, for example, its LHV at a particular pressure and temperature combination. The working fluid is generally selected to have an LHV that is lower than the maximum design temperature of the battery cell 120. Briefly referring to FIGS. 3A and 3B, when the working fluid begins to boil, the fluid circuit within the vapor chamber 104 begins to operate and heat is transferred to the PCM 142.

That is, the working fluid boils at the evaporator surface 136 and working fluid vapor flows to the condenser surface 138 where it condenses. The condenser surface 138 is thermally coupled to the PCM 142 and to the ducts 114. The air in the ducts 114 and the PCM 142 absorb heat from the condenser surface 138 and the temperatures of the air and the PCM 142 increase. If the rate of heat transfer from the working fluid to the PCM 142 is higher than the rate of heat transfer from the PCM 142 to the air in the ducts 114, the temperature of the PCM 142 increases. The temperature of the PCM 142 increases until the rate of heat transfer at the condenser surface 138 into the PCM 142 is lower than the rate of heat transfer from the PCM 142 to the air or until the PCM 142 reaches its LHF.

In the particular example illustrated in FIG. 4, the PCM 142 reaches its LHF at point 406 and the PCM 142 begins to melt, absorbing the LHF from the condensing working fluid. The PCM 142 melts without significant temperature rise as it absorbs the LHF. The LHF of the PCM 142 shown in FIG. 4 is below the LHV of the working fluid inside the vapor chamber 104.

At point 408, the battery module 24 reduces its rate of discharge, the temperature of the battery cell 120 begins to decrease, and the heat flux from the battery cell 120 to the vapor chamber 104 decreases. The temperature of the battery cell 120 lowers as heat is transferred to the working fluid. As the battery cell 120 cools, the temperature drops below the boiling temperature of the working fluid and heat no longer transfers from the battery cell 120 to the working fluid. Because the working fluid is still at its LHV, heat continues to transfer from the working fluid to the PCM 142 until the LHV is transferred to the PCM 142 and/or the air in the ducts 114 and the working fluid is in a subcooled state. The temperature of the working fluid tends to equalize with the temperature of the PCM 142 and/or the air in the ducts 114. Additionally, once the temperature of the battery cell 120 is below the temperature of the PCM 142, the temperature of the PCM 142 decreases. The PCM 142 resolidifies as it cools.

In some embodiments, the battery cell 120 may cool more quickly than the PCM 142. In such embodiments, the temperature of the battery cell 120 may decrease below a temperature of the PCM 142 while the PCM 142 retains some residual heat from the previous cycle of the battery cell 120. The residual heat retained in the PCM 142 may continue to flow to the battery cell 120 through the various thermal interfaces between the PCM 142 and the battery cell 120. If the battery cell 120 is activated again before the temperature of the PCM 142 has equalized with the temperature of the battery cell 120, the residual heat in the PCM 142 reduces the maximum temperature differential between the starting temperature of the battery cell 120 and the maximum operating temperature of the battery cell 120 for a given battery cycle. Such a reduction in the maximum temperature differential can, among other things, reduce internal stresses on battery components and prolong the life of battery.

It should now be understood that embodiments of the present disclosure combine the thermal characteristics of a vapor chamber and a phase change material (PCM) into a single heat management system for removing heat from a battery module. The battery cell may discharge converting chemical energy to electrical energy and generating waste heat. This waste heat may be absorbed by the working fluid of the vapor chamber and rejected from the working fluid to the PCM. The boiling point of the working fluid in the vapor chamber and the melting temperature of the PCM may be selected such that the PCM can reject the waste heat to air flowing through one or more ducts in the thermal management system. Accordingly, the battery cell may reject its waste heat, protecting it from excessive temperature situations, prolonging the useful life of the battery cell and ultimately the vehicle in which it is used.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A thermal management system for removing waste heat from a battery cell comprising:
   a unit cell that comprises:
      a vapor chamber comprising an evaporator surface and a condenser surface, wherein the evaporator surface and the condenser surface are fluidly connected by a wick, and the evaporator surface is coupled to a first face of the battery cell and absorbs waste heat generated by the battery cell;
      a phase change material (PCM) shell comprising:
         a first capsule encapsulating a first PCM, wherein the first capsule is coupled to a first edge surface of the battery cell, wherein the first edge surface intersects the first face and a second face of the battery cell;
         a second capsule encapsulating a second PCM, wherein the second capsule is spaced apart from the first capsule in a direction that is both transverse to a vertical direction and away from the first edge surface, and is coupled to the condenser surface of the vapor chamber; and
         one or more ribs separating the first capsule and the second capsule, wherein the one or more ribs are thermally anisotropic, allowing thermal energy to flow from the vapor chamber to the one or ribs while restricting the flow of thermal energy from the one or more ribs to the vapor chamber, wherein the condenser surface is coupled to and extends between the first and second capsules and rejects waste heat to the first and second PCM.

2. The thermal management system of claim 1, wherein the PCM shell comprises one or more ducts positioned between the first capsule and the second capsule and positioned between the second capsule and the battery cell.

3. The thermal management system of claim 1, wherein the PCM shell comprises a metal foam including one or more pores.

4. The thermal management system of claim 1, wherein the specific heat capacity of the first PCM and the second PCM are different.

5. The thermal management system of claim 1, wherein the first capsule is positioned closer to the battery cell than the second capsule.

6. The thermal management system of claim 1, wherein the unit cell further comprises:
   a second vapor chamber comprising a second working fluid and a second evaporator surface and a second condenser surface that are fluidly connected by a second wick; and
   a second PCM shell encapsulating a third PCM, wherein:
   the second evaporator surface is coupled to the battery cell and absorbs waste heat generated by the battery cell;
   the second condenser surface is coupled to the third PCM and rejects waste heat to the third PCM.

7. The thermal management system of claim 6, wherein the second PCM shell comprises a third capsule and a fourth capsule.

8. The thermal management system of claim 7, wherein the third capsule encapsulates the third PCM and the fourth capsule encapsulates a fourth PCM.

9. The thermal management system of claim 8, wherein the specific heat capacity of the third PCM and the fourth PCM are different.

10. The thermal management system of claim 1, wherein the unit cell is positioned within an array of unit cells.

11. The thermal management system of claim 1, further comprising one or more ducts that extend in the vertical direction between an inlet and an outlet, wherein the one or more ducts are positioned between first capsule and the second capsule.

12. A unit cell for a battery module, the unit cell comprising:
   a vapor chamber comprising an evaporator surface coupled to a first face of a battery cell, and a condenser surface, wherein the evaporator surface and the condenser surface are fluidly connected by a wick; and
   a phase change material (PCM) shell comprising:
      a first capsule encapsulating a first PCM, wherein the first capsule is coupled to a first edge surface of the battery cell and is coupled to the condenser surface of the vapor chamber, wherein the first edge surface intersects the first face and a second face of the battery cell;
      a second capsule encapsulating a second PCM, wherein the second capsule is spaced apart from the first capsule in a direction that is both transverse to a vertical direction and away from the first edge surface, and is coupled to the condenser surface of the vapor chamber; and
      one or more ribs separating the first capsule and the second capsule, wherein the one or more ribs are thermally anisotropic, allowing thermal energy to flow from the vapor chamber to the one or ribs while restricting the flow of thermal energy from the one or more ribs to the vapor chamber, wherein:
         the evaporator surface is configured to transfer heat from the first surface of the battery cell to a working fluid to heat the working fluid to evaporate the working fluid,
         the condenser surface extends between the first and second capsules and is configured to transfer heat from the working fluid to the first PCM and the second PCM to condense the working fluid, and
         a latent heat of fusion temperature of at least one of the first PCM and the second PCM is lower than a latent heat of vaporization temperature of the working fluid.

13. The unit cell of claim 12, wherein first PCM and the second PCM comprise different specific heat capacities.

14. A vehicle including a thermal management system for removing heat from a plurality of battery cells of a battery module of the vehicle, the thermal management system comprising an array of unit cells, each unit cell comprising:
   a vapor chamber comprising a working fluid and an evaporator surface and a condenser surface that are fluidly connected by a wick, and the evaporator surface is coupled to a first face of a battery cell of the plurality of battery cells and absorbs waste heat generated by the battery cell; and
   a phase change material (PCM) shell comprising:
      a first capsule encapsulating a first PCM, wherein the first capsule is coupled to a first edge surface of the battery cell of the plurality of battery cells and is coupled to the condenser surface of the vapor chamber, wherein the first edge surface intersects the first face and a second face of the battery cell;
      a second capsule encapsulating a second PCM, wherein the second capsule is spaced apart from the first capsule in a direction that is both transverse to a vertical direction and away from the first edge surface, and is coupled to the condenser surface of the vapor chamber; and one or more ribs separating the first capsule and the second capsule, wherein the one or more ribs are thermally anisotropic, allowing thermal energy to flow from the vapor chamber to the one or ribs while restricting the flow of thermal energy from the one or more ribs to the vapor chamber, wherein the condenser surface extends between the first capsule and the second capsule and is coupled to the first and second PCM and rejects waste heat to the first and second PCM.

15. The vehicle of claim 14, wherein each unit cell further comprises:
- a second vapor chamber comprising a second working fluid and a second evaporator surface and a second condenser surface that are fluidly connected by a second wick; and
- a second PCM shell encapsulating a third PCM, wherein:
the second evaporator surface is coupled to at least one battery cell of the plurality of battery cells and absorbs waste heat generated by at least one battery cell of the plurality of battery cells;
the second condenser surface is coupled to the third PCM and rejects waste heat to the third PCM.

16. The vehicle of claim 15, wherein the second PCM shell comprises a third capsule encapsulating the third PCM and a fourth capsule encapsulating a fourth PCM.

17. The vehicle of claim 16, wherein the first PCM and the third PCM are coupled to opposing sidewalls of at least one battery cell of the plurality of battery cells.

18. The vehicle of claim 15, wherein the PCM shell and the second PCM shell comprise one or more ducts.

19. The vehicle of claim 15, wherein the latent heat of vaporization of the working fluid and the second working fluid of each unit cell are equivalent along a length of the array of unit cells.

20. The vehicle of claim 15, wherein the latent heat of vaporization of the working fluid and the second working fluid vary along the length of the array of unit cells.

* * * * *